No. 873,553. PATENTED DEC. 10, 1907.
A. JOHNSON.
SNAP HOOK.
APPLICATION FILED APR. 29, 1907.
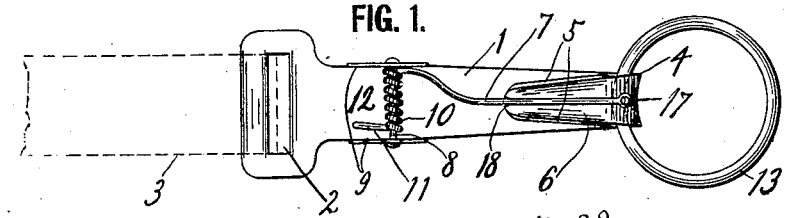
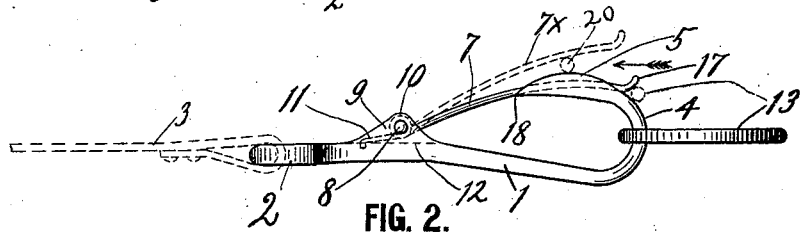
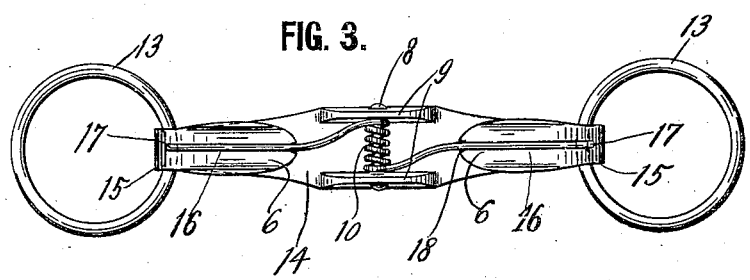
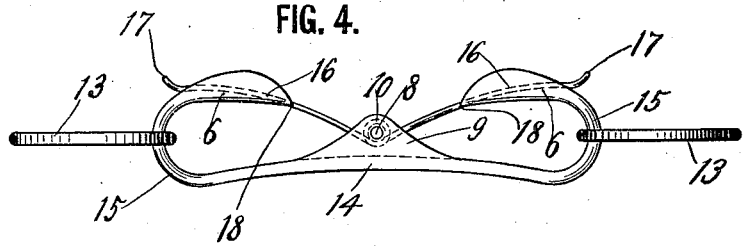
WITNESSES:
D. E. Carlsen.
L. E. Carlsen.
INVENTOR:
ABNER JOHNSON.
BY HIS ATTORNEY:
A. M. Carlsen.

UNITED STATES PATENT OFFICE.

ABNER JOHNSON, OF STRANDQUIST, MINNESOTA.

SNAP-HOOK.

No. 873,553.  Specification of Letters Patent.  Patented Dec. 10, 1907.

Application filed April 29, 1907. Serial No. 370,785.

*To all whom it may concern:*

Be it known that I, ABNER JOHNSON, a citizen of the United States, residing at Strandquist, in the county of Marshall and State of Minnesota, have invented a new and useful Snap-Hook, of which the following is a specification.

My invention relates to improvements in snap-hooks, and has for its object the providing of a durable, practical and inexpensive hook of the class mentioned.

In the accompanying drawing Figure 1 is a single snap-hook according to my improvement. Fig. 2 is a side elevation of Fig. 1. Fig. 3 is a top view of my improvement as used on a double or tandem hook, and Fig. 4 is a side view of Fig. 3.

Referring to the drawing by reference numerals, 1 (in Figs. 1 and 2) is the body of the hook having at one end the usual slot 2, into which is inserted a strap 3, and at the other end the hook proper 4, which is made about the size and shape of the ordinary snap-hooks in use, but the end of the hook of my device is provided on both sides with wings or upsets 5, forming an external groove 6, in which rests the arm 7 of a spring 10, which may be made of wire and is wound around the shaft or pintle 8 secured in the wings 9 of the body of the device, and the shorter arm 11 of the spring projects in opposite direction and bears on the surface 12 of the body piece.

13 represents the ring of a hitching strap, a cock-eye, or any other hook to be inserted in the snap hook.

In Figs. 3 and 4, 14 is the body of a double snap-hook, showing the bent ends 15 of the same shape as the end 4 of the single hook. In the double hook, however, both ends 16 of the spring 10 are made use of as spring arms or tongues resting in the groove 6 in each hook and serve the same purpose as in the single hook. The end of each spring arm both in the single and in the double form is turned up as at 17 in Figs. 2 and 4.

In Figs. 1 and 3 at the extreme ends of the hooks are shown notches 18; the spring on the snap hook fits into this notch in such a manner as to leave no projection or obstruction which may possibly be caught by the ring or hook 13 and cause an accidental opening of the snap hook.

The snap-hook is manipulated in the following manner: The ring or hook that is to be inserted in this snap hook is pressed between the curved portion of the hook 4 and the curved end 17 of the spring, as shown by dotted lines 20 in Fig. 2, and by pushing the ring in the direction indicated by the arrow in Fig. 2 the spring or spring-arm 7 is forced upward as shown at $7^\times$, and the instant that the ring 13 reaches the extreme end of the hook the spring snaps back into place and the ring is in the hook. To remove the hook the above operation is reversed by simply lifting the spring 7 with the hand, or by pressing ring 13 upward against the spring until it is far enough between the spring and the end of the hook to hold the spring raised, the ring is then simply pulled out. It will be understood that when the spring arm 7 is lifted to admit anything into the hook it is guided back to its place in the groove 6 and notch 18 by the V-shaped groove 6 besides by its normal tendency to keep in line with said groove.

Having thus fully described my invention, what I claim is:—

1. A snap-hook having adjacent the point of its hook an external longitudinal groove, and a spring arm extending from the body of the hook and resting in said groove, said spring arm projecting beyond the end of the groove to facilitate the raising of the arm by engaging its end.

2. A snap-hook comprising an elongated body with externally grooved hooks one at each end thereof, lugs or lips upon the middle of the body, a pin passed through the lips in transverse direction to the body, a spring encircling the pin and having its ends resting in the grooves of the hooks.

In testimony whereof I affix my signature, in presence of two witnesses.

ABNER JOHNSON.

Witnesses:
NELS A. JOHNSON,
J. J. OESTAD.